(12) United States Patent
Dulieu et al.

(10) Patent No.: US 6,254,768 B1
(45) Date of Patent: Jul. 3, 2001

(54) WATER FILTER CARAFE

(75) Inventors: Paul D. Dulieu, Honeoye Falls, NY (US); Mark C. Steiner, Atlanta, GA (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 09/335,260

(22) Filed: Jun. 17, 1999

Related U.S. Application Data
(60) Provisional application No. 60/093,512, filed on Jul. 21, 1998.

(51) Int. Cl.[7] .................................................. B01D 17/12
(52) U.S. Cl. ............................ 210/91; 210/455; 210/473; 210/474; 210/510.1
(58) Field of Search ............................... 210/85, 91, 266, 210/282, 472–477, 482, 232, 490, 500.21, 500.25, 510.1, 94, 445, 455

(56) References Cited

U.S. PATENT DOCUMENTS

| | | | |
|---|---|---|---|
| 4,329,162 | * | 5/1982 | Pitcher . |
| 4,340,403 | * | 7/1982 | Higuchi et al. . |
| 4,428,758 | * | 1/1984 | Monteirth . |
| 4,540,489 | * | 9/1985 | Barnard . |
| 4,781,831 | * | 11/1988 | Goldsmith . |
| 4,894,160 | * | 1/1990 | Abe et al. . |
| 4,969,996 | * | 11/1990 | Hankhammer . |
| 5,009,781 | * | 4/1991 | Goldsmith . |
| 5,114,581 | * | 5/1992 | Goldsmith . |
| 5,128,036 | * | 7/1992 | Svenson et al. . |
| 5,198,007 | * | 3/1993 | Moyer et al. . |
| 5,415,775 | * | 5/1995 | Castillon et al. ............... 210/500.25 |
| 5,451,444 | * | 9/1995 | Deliso et al. . |
| 5,597,617 | * | 1/1997 | Deliso et al. . |
| 5,750,026 | * | 5/1998 | Gadakree et al. ................ 210/510.1 |
| 5,830,360 | * | 11/1998 | Mozayeni .............................. 210/473 |
| 5,873,995 | * | 2/1999 | Huang et al. ........................ 210/472 |
| 6,103,114 | * | 8/2000 | Tanner et al. ....................... 210/477 |

FOREIGN PATENT DOCUMENTS

| | | | |
|---|---|---|---|
| 745416 | * | 12/1996 | (EP) . |
| 792676 | * | 9/1997 | (EP) . |
| 96/31440 | | 10/1996 | (WO) . |

* cited by examiner

*Primary Examiner*—Joseph W. Drodge
(74) *Attorney, Agent, or Firm*—Kees van der Sterre

(57) ABSTRACT

A water filtering carafe comprising a raw water reservoir, a filtered water reservoir, and a gravity-flow cyst reduction water filter cartridge for filtering raw water passing from the raw into the filtered water reservoir, the carafe including a mounting receptacle for the filter cartridge which forms a cyst-blocking water seal as the filter is mounted therein, such that the combination of the water seal and water filter cartridge provides at least a 99.95% reduction in particles of 3–4 microns diameter in a charge of raw water passing from the raw water reservoir into the filtered water reservoir.

2 Claims, 4 Drawing Sheets

WATER FILTER CARAFE

This application claims the benefit of U.S. Provisional Application No. 60/093,512, filed Jul. 21, 1998, entitled "Water Filter Carafe", by Paul D. Dulieu and Mark C. Steiner.

BACKGROUND OF THE INVENTION

The present invention relates generally to water filter carafes and more particularly to a cyst-reduction water filter carafe which can deliver substantial volumes of filtered water at relatively low (gravity-assisted) water pressures, the filtered water being substantially free of parasites and other impurities.

Gravity flow water filtration units continue to gain in popularity as consumers become concerned about the quality of available drinking water supplies. Carafe gravity flow units effectively address this concern because of their relatively low cost and perceived efficiency in removing unwanted tastes, odors, and harmful pollutants.

Operation of these units is simple and convenient. Water is simply poured into the top of the unit and is allowed to trickle through a replaceable filter cartridge to a treated water reservoir for later use. Early filter cartridges were typically packed-bed units containing carbon pellets for the removal of adsorbable/catalyzable constituents such as chlorine and organics, and ion exchange resins for the removal of metal ions such as lead. Bacteriostatic agents such as silver may also be present. More recently, cyst-reduction water filters incorporating cellular ceramic honeycomb filter elements of selectively plugged channel configuration have been developed. These filters, described for example in the co-pending, commonly assigned U.S. patent application of W. Cutler et al., Ser. No. 09/211,134 filed Dec. 14, 1998 (that application being expressly incorporated herein by reference), can provide true cyst reduction performance at gravity flow filtration rates of at least 200 ml/minute. By "cyst reduction" in a filter, filter system, or filtration process is meant a filter, filter system, or process capable of providing at least 99.95% removal of 3–4 $\mu$m particles from a raw water source when tested in accordance with NSF Standard 53, Drinking Water Treatment Units—Health Effects (September 1997).

Although filter designs and materials capable of effective cyst reduction exist, significant problems remain concerning appropriate methods and designs for incorporating such materials or filters into effective, gravity-fed water carafe purification systems. This is because cyst reduction pertains to a health concern, rather than a lesser concern about water taste and odor.

Any successful carafe filtration system must first prevent the mixing of unfiltered water with water already treated by the filter. Current carafe systems are not designed for cyst filtration. For example, that the seal positioned between the filter cartridge and the carafe inlet reservoir on a typical commercial carafe is typically a loose taper fit. Such seals readily allow unfiltered water to enter the filtered water chamber via the pour spout, reservoir/filter seal, and/or reservoir/carafe seal. In these designs, therefore, contamination of the raw water with unfiltered water can occur during filling, during the filtration process, or during pouring. Obviously, only minor leaks of raw water to the filtered water reservoir are needed to entirely negate the health benefits to be derived from the use of a cyst reduction filter element, no matter how effective the cyst removal of that element may be.

SUMMARY OF THE INVENTION

The present invention provides a gravity flow water carafe design offering true cyst reduction performance. Central to the design is a positive, locking seal between a gravity-flow cyst reduction filter cartridge and the raw water reservoir of the carafe. Positive cartridge locking elements, with or without additional gasketing, secure a seal with the reservoir such that no unacceptable leakage of raw water past the cartridge and into the filtered water reservoir of the carafe can occur.

In one particularly preferred embodiment, the water seal is provided by a twist lock cartridge mount that includes locking tabs or pins on the cartridge (or reservoir) to engage with slot or other tab receptacles on the reservoir (or cartridge). The locking tabs or pins can effectively restrict cartridge installation to only correct, properly sealing mounting positions. For user protection, locking indicators of this type, or other visual, tactile, audible or similar indicators should be provided on the cartridge or within mounting assembly to provide visual or other sensory confirmation that the cartridge is correctly mounted in and sealed against the carafe mounting.

Further preferred embodiments of the carafe of the invention may include additional features to prevent the mixing of unfiltered with filtered water during filling or pouring. For example, the raw water reservoir may be provided as a tightly fitting sub-assembly which forms a seal with the carafe pitcher. This seal prevents raw water entry into the filtered water reservoir during filling. Further, the raw water reservoir may be provided with a sealed or tightly fitting cover comprising only a smaller hinged rear section to be opened for filling. The sealed forward section of the cover guards against the inadvertent release of raw water along with the filtered water as the latter is being dispensed from the carafe. The rear hinged section of the cover also permits filling of the carafe without complete removal of the cover.

In a first aspect, then, the invention includes a water filtering carafe designed for the effective use of a gravity-flow cyst reduction water filter cartridge. The filter cartridge selected for use in the carafe may comprise conventional inlet(s) for the raw water to be filtered and one or more outlets for the filtered water. The carafe includes a first reservoir for the raw water to be filtered and a second reservoir for collecting and storing the filtered water processed by the cyst reduction filter.

The raw and filtered water reservoirs are separated and isolated from each other by a suitable water-tight partition, e.g. a wall section which may form part of the raw or filtered water enclosures, the partition including a mounting receptacle into which the water filter cartridge is mounted. The cartridge is mounted in the receptacle such that the cartridge inlet opening is in communication with the raw water reservoir and the cartridge outlet opening is in communication with the filtered water reservoir.

Critical to the effective operation of the carafe is cyst-blocking water seal between the water filter cartridge and the mounting receptacle. By a cyst-blocking seal is meant a water seal, provided as part of the cartridge, part of the mounting receptacle, or both, that is sufficiently water-impermeable that the minimum cyst reduction effectiveness required of the cartridge is preserved by the cartridge-carafe assembly. The specific performance characteristic exhibited by the carafes of the invention is that the combination of the water seal and water filter cartridge effect at least 99.95% removal of 3–4 $\mu$m particles from a charge of raw water released into the filtered water reservoir, when the particle removal is tested in accordance with NSF Standard 53, Drinking Water Treatment Units—Health Effects (September 1997).

BRIEF DESCRIPTION OF THE DRAWINGS

The invention may be further understood by reference to the drawings, wherein.

DETAILED DESCRIPTION

Figure 1:
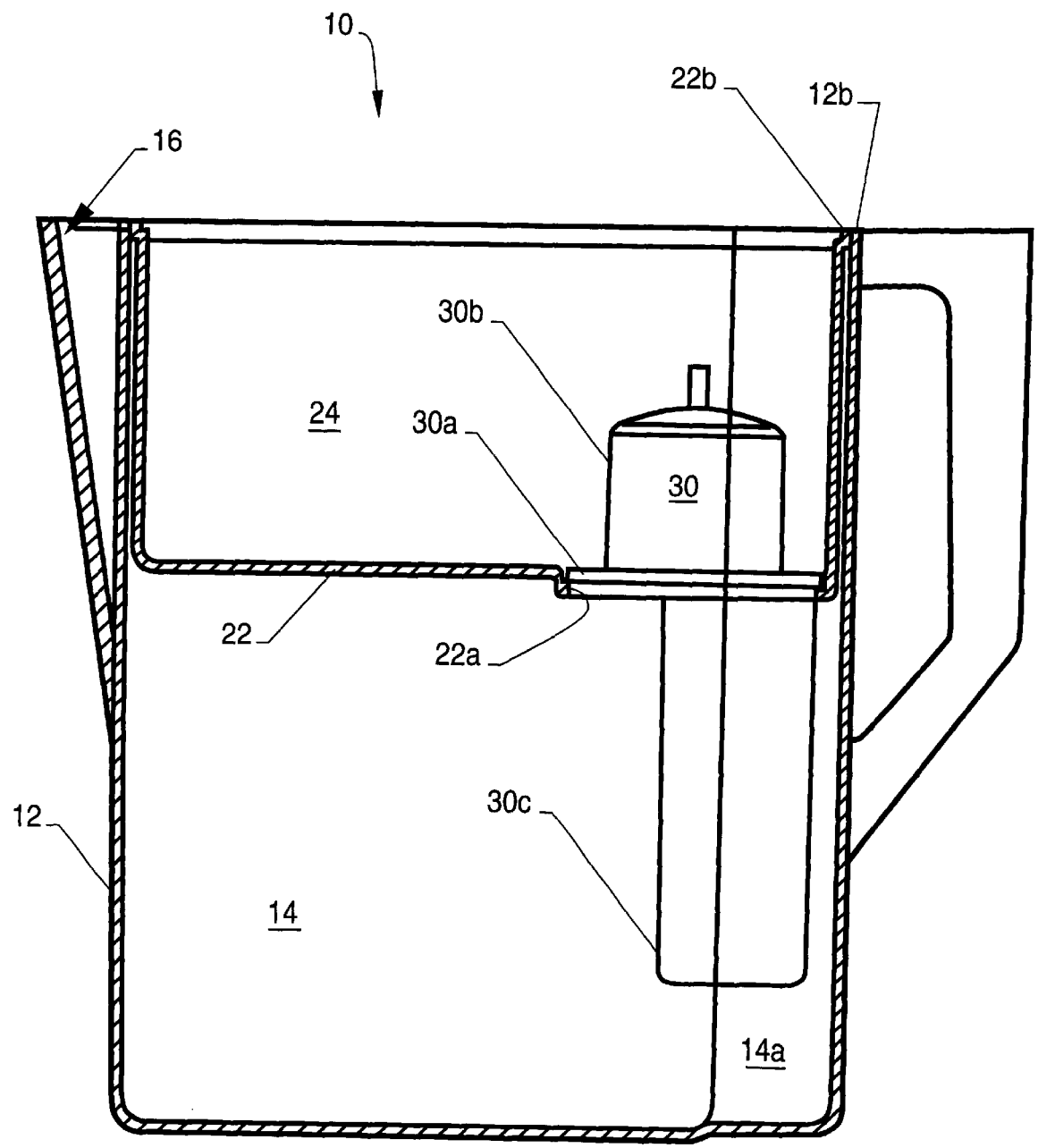
FIG. 1 is a schematic side view of a water filtering carafe provided in accordance with the invention.

A particularly preferred embodiment of the carafe of the invention is illustrated in FIG. 1 of the drawing. As shown in this schematic side partial cutaway view, carafe 10 comprises an outer container 12 forming a filtered water reservoir 14 from which water may be dispensed via pouring spout 16. Fitted within container 12 of carafe 10 is an inner container 22 forming a reservoir 24 to contain unfiltered or raw water added to the carafe.

Mounted in container 22, and extending both upwardly into raw water reservoir 24 and downwardly into filtered water reservoir 14, is filter cartridge 30. Cartridge 30 offers the only permitted water access path into filtered water reservoir 14 from raw water reservoir 24. Essentially, the cartridge provides a filtration conduit within which contaminants present in the raw water are removed as the water is transferred to the filtered water reservoir.

To insure that only filtered water enters reservoir 14, cartridge 30 is mounted within container 22 by means of a cyst-blocking water seal, formed by the combination of annular flange 30a on cartridge 30 and a circular mounting cutout 22a in the bottom of container 22. This seal insures that no leakage of raw water past cartridge 30 can occur. Further, container 22 is configured to fit closely into outer container 12, so that a seal between edge portion 22b of the raw water container and edge portion 12b of the filtered water container is formed around most of the peripheral edge portions of the two containers. This seal guards against raw water leakage into filtered water reservoir 14 during the filling of raw water reservoir 24.

Figure 2B:
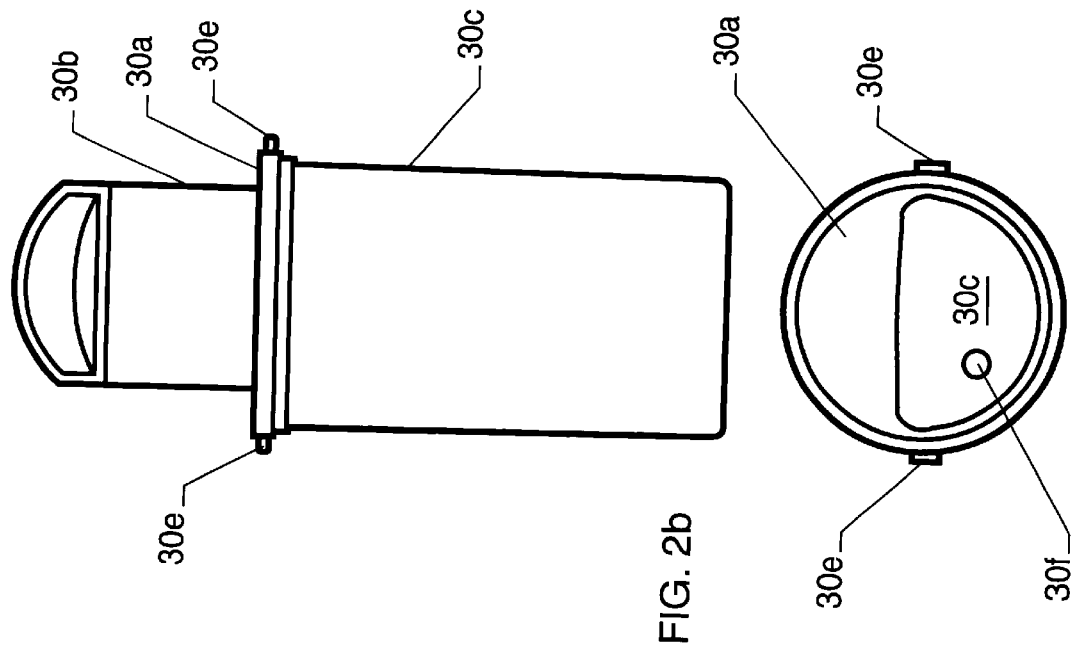
FIGS. 2a–2b set forth exterior views of a cyst-reduction water filter cartridge useful in the carafe of FIG. 1.
Figure 2A:
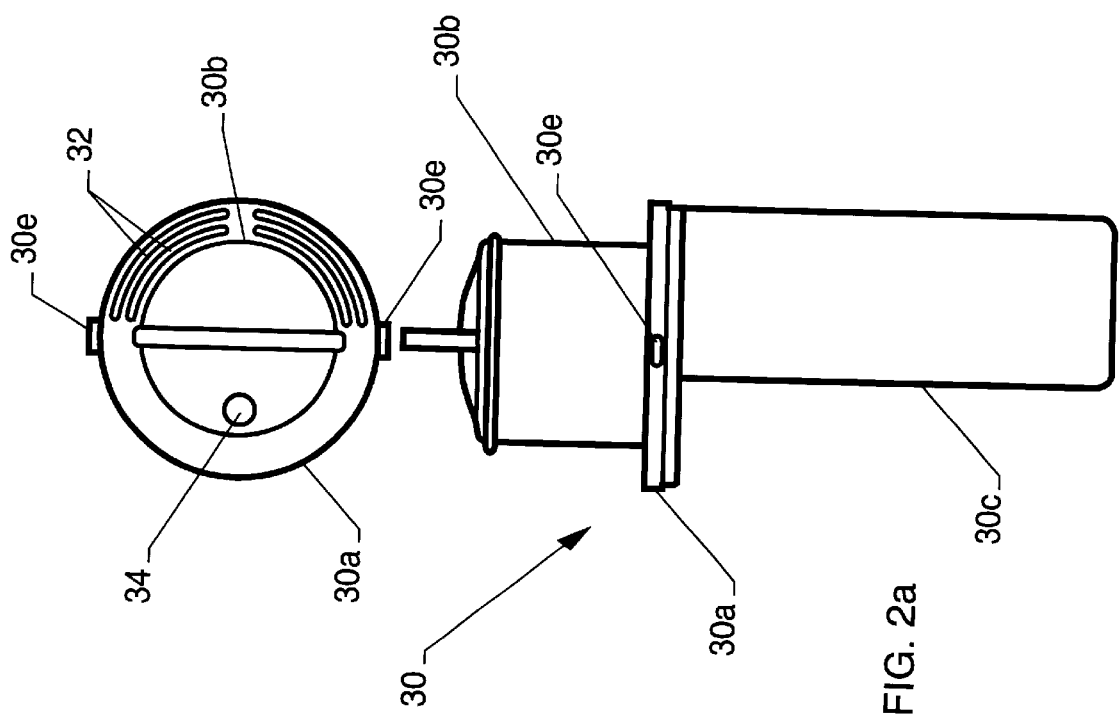

The design of water filter cartridge 30 is more fully shown in FIGS. 2a and 2b of the drawing. FIG. 2a shows top and side views of cartridge 30 as dismounted from container 22, while FIG. 2b shows front and bottom views of the cartridge. As shown in FIG. 2a, top portion 30b of the cartridge is cylindrical in shape, and includes inlet openings 32 through which raw water may enter the cartridge. Also shown in FIG. 2a is an opening 34 in top portion 30b, that opening providing visual access to an indicator on or within cartridge 30 which can indicate the age of the cartridge and/or the state of depletion of water purifying components therewithin.

As best seen in FIG. 2b of the drawing, bottom portion 30c of cartridge 30 is non-circular in cross-sectional shape, having a rounded, generally semi-circular cross-section in the particular embodiment shown in the drawing. The purpose of this non-circular bottom cross-section is to provide a clear indicator to a user of the carafe of the rotational position of cartridge 30 in opening 22a of raw water container 22. Referring again to FIG. 1, when properly mounted in container 22, base portion 30c of cartridge 30 will be rotated substantially into and largely occupy recess 14a of filtered water reservoir 14. In that position, locking tabs 30e shown in FIGS. 2a–2b will be fully engaged within a locking groove in opening 22a of raw water container (hereinafter more fully described), to "lock" the cartridge into sealing contact with container 22. It is by means of this twist lock that the cyst-blocking water seal between the cartridge and the container is assured.

Also provided in bottom portion 30c of cartridge 30 is a water outlet port 30f, as shown in FIG. 2b. This outlet provides for the release into filtered water reservoir 14 of filtered water passing through the cartridge from raw water inlets 32.

Figure 3A:
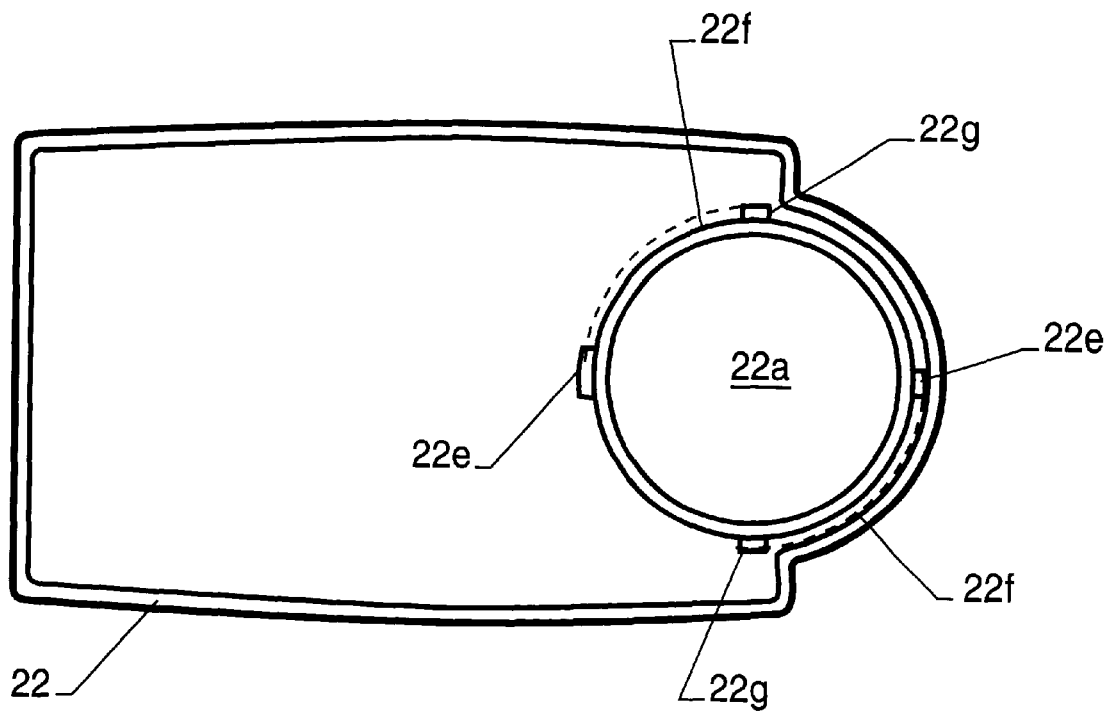
FIGS. 3a–3b are schematic top and side cross-sectional views, respectively, of a raw water reservoir useful in the carafe of FIG. 1.
Figure 3B:
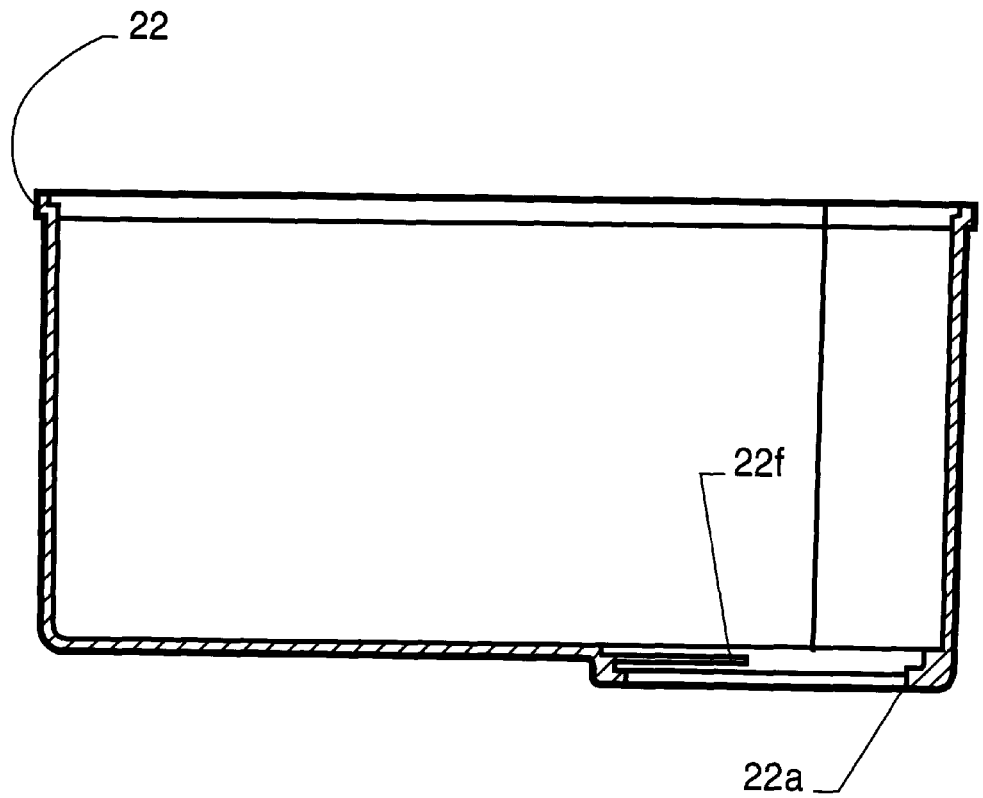

Elements of the twist-lock cartridge mount for assuring a cyst-blocking water seal between cartridge 30 and raw water container 22 are further illustrated in FIGS. 3a and 3b of the drawing, which are top and cutaway side views, respectively, of the container. As shown in those figures, circular mounting cutout 22a in raw water container 22 is provided with opposing tab recesses 22e which open into tab slots 22f in the bottom wall of container 22 (shown in phantom in FIG. 3a). These openings and slots are configured to engage with locking tabs 30e provided on mounting flange 30a of cartridge 30 as shown in FIGS. 2a–2b.

To sealingly mount cartridge 30 in cutout 22a of reservoir 22, tabs 30e on flange 30a are positioned within tab openings 22e, and cartridge 30 is then rotated within cutout 22a until the tabs engage stops 22g in each of tab slots 22f. Full engagement of the cartridge is confirmed when the bottom portion 30c of cartridge 30 is rotated as far as possible into section 14a of filtered water reservoir 14. If desired, and depending on the properties of the materials used to form cartridge 30 and reservoir 22, additional sealing or gasketing materials (not shown) may be provided on flange 30a and/or within cutout 22a to further insure a leak-proof seal.

As previously noted, the avoidance of water spillage from raw water reservoir 24 into filtered water reservoir 14 is also important for the assurance of filtered water quality. One approach for isolating the raw water reservoir from other parts of the carafe involves an appropriately designed lid or cover for the carafe assembly, as illustrated in FIGS. 4 and 5 of the drawing.

Figure 4:
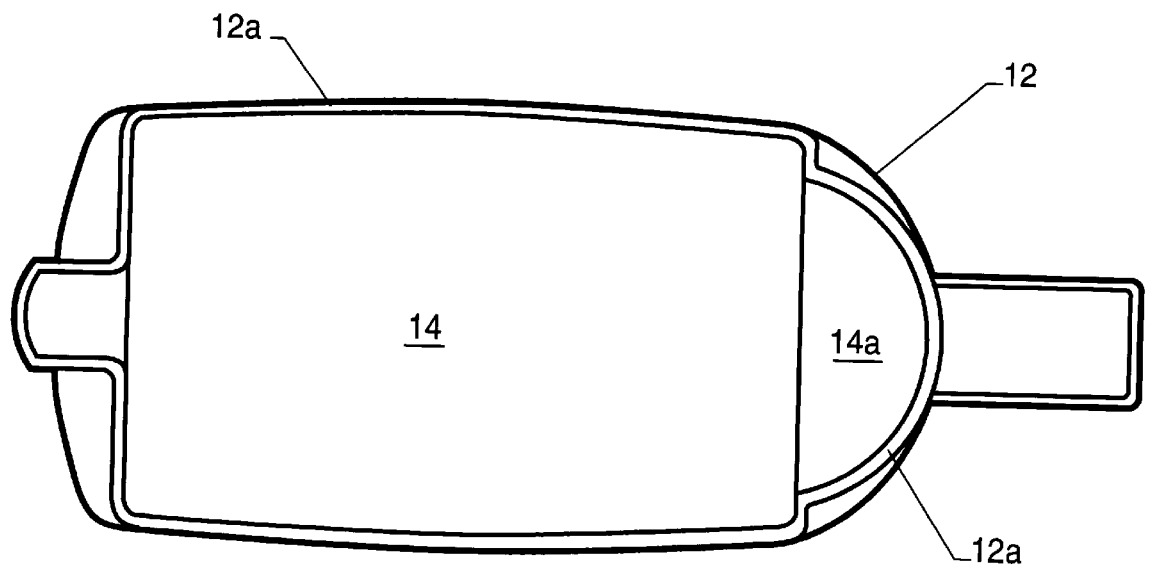
FIG. 4 is a top plan view of the carafe of FIG. 1 with the raw water reservoir removed.
Figure 5:
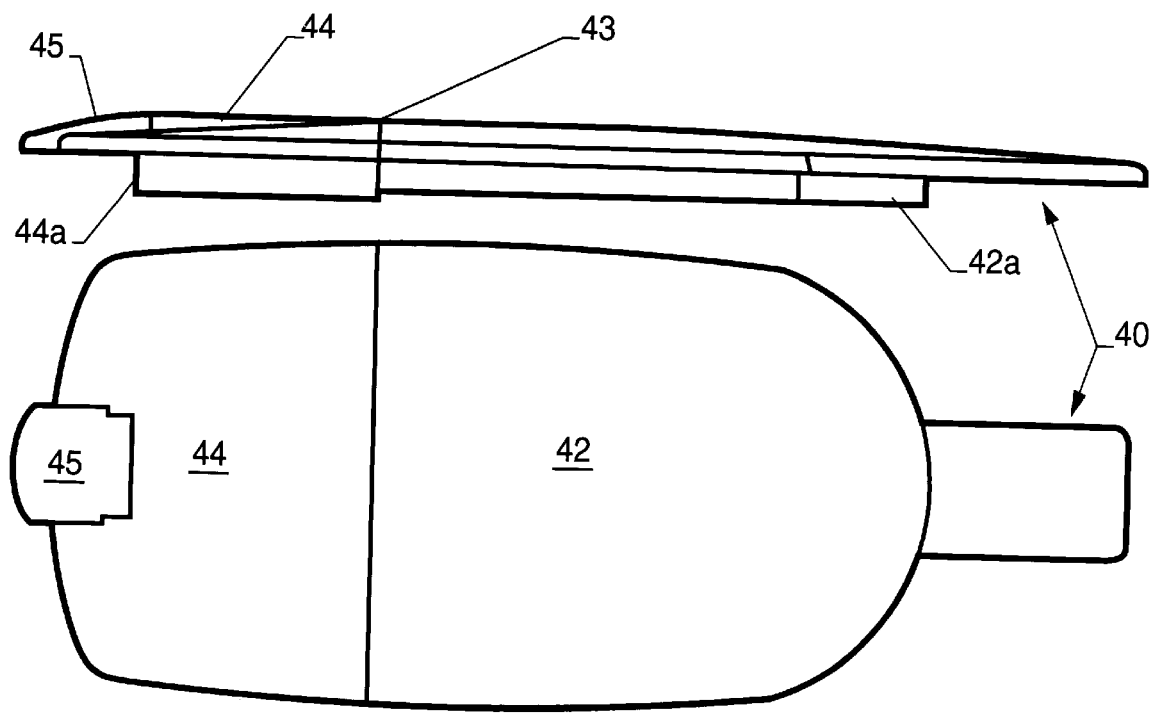
FIG. 5 presents top and side views of a sealing cover useful with the carafe of FIG. 1.

FIG. 4 of the drawing is a top view of outer container 12 of the carafe shown in FIG. 1 of the drawing. In FIG. 4, top edge 12a of the container defines the opening into which raw water container 22 closely fits, and over which a suitable cover is required. FIG. 5 of the drawing presents top and side views of a carafe cover 40 adapted to cover the openings defined by the combination of outer container 12 and raw water container 22. Cover 40 includes rear portion 42 and forward portion 44, the forward portion including a small hinged flap 45 from which filtered water from reservoir 14 may be dispensed.

Rear portion 42 of cover 40 is connected to forward portion 44 of the cover at hinge 43. When cover 40 is set onto the carafe of FIG. 1 to cover the openings in containers 12 and 22, hinge 43 permits the lifting of only rear cover portion 42. In this way filling access to raw water reservoir 24 can be achieved without completely removing the cover and risking raw water spillage into dispensing spout 16.

When rear cover section 42 is closed, downwardly extending skirt seal sections 44a and 42a of cover 40 extend into and fit closely against the inside top edge of raw water container 22. This provides for the effective closure of container 22, so that filtered water from reservoir 14 may be dispensed from spout 16 through flap 45 without the risk that raw water from reservoir 24 will be dispensed at the same time.

The materials and methods used to fabricate a carafe in accordance with the invention are not critical, but may be selected from among those known in the art depending upon the particular capacities, shapes and configurations desired. Likewise, the particular elements to be included in the cyst reduction filter cartridges for effective water purification and cyst reduction may be selected from among those known to be effective for use in gravity flow carafe designs. Particularly preferred, however, are the gravity flow cyst filters described in the aforementioned co-pending, commonly assigned U.S. patent application of W. Cutler et al., Ser. No. 09/211,134 filed Dec. 14, 1998, expressly incorporated by reference hereinabove.

As disclosed in that application, gravity flow filters incorporating a cellular ceramic honeycomb filter element of a selectively plugged channel configuration, wherein all water filtration paths traverse porous channel walls having a porosity characterized by a median pore diameter in the range of about 2–8 micrometers wherein pores over 10 microns in diameter comprise not more than 10% of the open pore volume, will exhibit at least 99.95% removal of 3–4 $\mu$m particles when tested in accordance with NSF Standard 53, Drinking Water Treatment Units—Health Effects. And, they provide a primed water flux in the range of 1.5–30 ml/min/cm$^3$ at $\leq$0.3 psig at a filter volume not exceeding about 150 cm$^3$. It is filters of this type which can provide true cyst reduction performance at commercially acceptable gravity flow filtration rates.

Of course, the particular elements and combinations hereinabove described are merely illustrative of the invention, and it will therefore be apparent to those skilled in the art that numerous variations and modifications of the particular embodiments described may be resorted to within the scope of the appended claims.

We claim:

1. A water filtering carafe comprising:
   a raw water reservoir and a filtered water reservoir, the reservoirs being separated by a partition and the filtered water reservoir comprising a recess in a sidewall thereof;
   a gravity-flow cyst reduction water filter cartridge having an inlet opening for raw water, an outlet opening for filtered water, and an asymmetric outer cartridge surface of substantially semicircular cross-section;
   a mounting receptacle in the partition for mounting the water filter cartridge in the partition with the inlet opening in communication with the raw water reservoir and the outlet opening in communication with the filtered water reservoir; and
   a cyst-blocking water seal between the water filter cartridge and the receptacle within the partition formed by positive, locking seal means;
   the cartridge providing a visual indication that a cyst-blocking water seal has been provided through rotation substantially into and largely occupying a recess in the filtered water reservoir;
   the water filter cartridge incorporating a cellular ceramic honeycomb filter element of a selectively plugged channel configuration wherein all water filtration paths traverse porous channel walls having a porosity characterized by a median pore diameter in the range of about 2–8 micrometers wherein pores over 10 microns in diameter comprise not more than 10% of the open pore volumes and the combination of the water seal and water filter cartridge providing at least 99.95% removal of 34 $\mu$m particles from a raw water stream passing from the raw water reservoir to the filtered water reservoir when the water stream is tested in accordance with NSF Standard 53, Drinking Water Treatment Units—Health Effects (September 1997).

2. In a water filtering carafe comprising a raw water reservoir, a filtered water reservoir separated by a partition from the raw water reservoir, a cover for the raw water reservoir comprising a sealed forward section preventing raw water release during pouring and a hinged rear section permitting reservoir filling without cover removal, and a gravity-flow cyst reduction water filter cartridge disposed between the reservoirs, the cartridge being mounted in a receptacle in the partition to form a cyst-blocking water seal therewith, the improvements wherein:
   the cartridge has an asymmetric outer cartridge surface of substantially semicircular cross-section providing a visual indication of the presence of the cyst-blocking water seal, that indication being provided through the rotation of the semi-circular cross-section substantially into a recess in the filtered water reservoir; and
   the water filter cartridge incorporates a cellular ceramic honeycomb filter element of a selectively plugged channel configuration wherein all water filtration paths traverse porous channel walls having a porosity characterized by a median pore diameter in the range of about 2–8 micrometers wherein pores over 10 microns in diameter comprise not more than 10% of the open pore volume;
the combination of the water seal and water filter cartridge thereby providing at least 99.95% removal of 3–4 $\mu$m particles from a raw water stream passing through the filter cartridge from the raw water reservoir to the filtered water reservoir, when the water stream is tested in accordance with NSF Standard 53, Drinking Water Treatment Units—Health Effects (September 1997).

* * * * *

UNITED STATES PATENT AND TRADEMARK OFFICE
CERTIFICATE OF CORRECTION

PATENT NO.    : 6,254,768 B1
DATED         : July 3, 2001
INVENTOR(S)   : Dulieu et al.

It is certified that error appears in the above-identified patent and that said Letters Patent is hereby corrected as shown below:

Column 6,
Line 16, "pore volumes" should be -- pore volume, --.
Line 18, "of 34 µm" should be -- of 3-4 µm --.

Signed and Sealed this

Twenty-third Day of July, 2002

*Attest:*

*Attesting Officer*

JAMES E. ROGAN
*Director of the United States Patent and Trademark Office*